(12) United States Patent
Forloni et al.

(10) Patent No.: US 8,178,210 B2
(45) Date of Patent: May 15, 2012

(54) MULTILAYER ORIENTED HIGH-MODULUS FILM

(75) Inventors: Roberto Forloni, Milan (IT); Eugenio Longo, Rho (IT)

(73) Assignee: Cryovac, Inc., Duncan, SC (US)

( * ) Notice: Subject to any disclaimer, the term of this patent is extended or adjusted under 35 U.S.C. 154(b) by 1330 days.

(21) Appl. No.: 10/565,868

(22) PCT Filed: Jul. 21, 2004

(86) PCT No.: PCT/EP2004/051560
§ 371 (c)(1), (2), (4) Date: Jul. 12, 2006

(87) PCT Pub. No.: WO2005/011978
PCT Pub. Date: Feb. 10, 2005

(65) Prior Publication Data
US 2007/0031691 A1    Feb. 8, 2007

(30) Foreign Application Priority Data

Jul. 30, 2003  (EP) .................................... 03017259

(51) Int. Cl.
*B32B 27/08* (2006.01)
*B32B 27/32* (2006.01)
*B32B 27/34* (2006.01)
*B32B 27/36* (2006.01)
*B32B 27/28* (2006.01)

(52) U.S. Cl. .................. 428/483; 264/235.8; 428/475.2; 428/476.3; 428/476.9; 428/516; 428/515; 428/520

(58) Field of Classification Search .................. 428/480, 428/483, 500, 515, 520; 264/235.8
See application file for complete search history.

(56) References Cited

U.S. PATENT DOCUMENTS

| | | | | |
|---|---|---|---|---|
| 3,541,040 A | * | 11/1970 | Laird et al. | 523/169 |
| 3,969,176 A | * | 7/1976 | Bassett et al. | 156/251 |
| 4,120,716 A | | 10/1978 | Bonet | |
| 4,496,714 A | * | 1/1985 | Murata et al. | 528/272 |
| 4,883,696 A | * | 11/1989 | Iwanami et al. | 428/35.4 |
| 6,063,462 A | | 5/2000 | Tsukamoto et al. | |
| 6,682,825 B1 | | 1/2004 | Kennedy et al. | |
| 2003/0108755 A1 | * | 6/2003 | Murschall et al. | 428/480 |

FOREIGN PATENT DOCUMENTS

| | | |
|---|---|---|
| EP | 0 962 300 A1 | 12/1999 |
| EP | 1 060 866 A | 12/2000 |
| EP | 1 190 847 A1 | 3/2002 |
| EP | 1 207 035 A1 | 5/2002 |
| EP | 0 476 836 B2 | 7/2004 |
| JP | 07206015 A * | 8/1995 |
| WO | 95/26867 | 10/1995 |
| WO | 99/15289 | 4/1999 |
| WO | 99/44823 | 9/1999 |
| WO | 99/44824 | 9/1999 |
| WO | 99/55528 | 11/1999 |
| WO | 00/37253 | 6/2000 |
| WO | 01/98081 A2 | 12/2001 |

OTHER PUBLICATIONS

DERWENT abstract of Hamada et al. (JP 07206015 A) 1995.*
ASTM D-882, Standard Test Methods for Tensile Properties of Thin Plastic Sheeting, pp. 194-199.
ASTM D-1238, Standard Test Method for Flow Rates of Thermoplastics by Extrusion Plastometer, pp. 250-258.
ASTM D-2732, Standard Test Method for Unrestrained Linear Thermal Shrinkage of Plastic Film and Sheeting, pp. 368-371.

* cited by examiner

*Primary Examiner* — Callie Shosho
*Assistant Examiner* — John Freeman
(74) *Attorney, Agent, or Firm* — Rupert B. Hurley, Jr.

(57) ABSTRACT

The invention relates to a high modulus, bi-axially oriented film, heat-shrinkable or non heatshrinkable, comprising a first outer layer comprising a polyester or a copolyester, a second outer layer comprising an ethylene or propylene homo- or co-polymer, a core layer comprising an ethylene-vinyl alcohol copolymer, and no core polyamide or polyester layers. The film according to the present invention is prepared by orienting biaxially a flat extruded tape by means of a tenter frame, preferably simultaneously, and has a modulus higher than 6,000 kg/cm$^2$ in at least one direction. The film of the present invention is particularly useful, in the non heat-shrinkable version, for food and non food packaging applications.

22 Claims, No Drawings

MULTILAYER ORIENTED HIGH-MODULUS FILM

TECHNICAL FIELD

The present invention relates to a high modulus multilayer oriented film with a first outer layer comprising a polyester or co-polyester, a second outer layer comprising an ethylene-or propylene-homo-or co-polymer, a core layer comprising an ethylene-vinyl alcohol copolymer, and no polyamide or polyester core layers.

The invention also relates to a process for the manufacture of the new film and to the use of the new film in packaging applications.

BACKGROUND ART

Oriented films with a first outer layer of a polyester or copolyester, a second outer layer of a polyolefin, and a gas-barrier layer of EVOH have been described in the patent literature, see for instance EP-A476,836, WO 99/55528, WO 99/44824, WO 99/44823, EP-A-1,190,847, and WO 01/98081.

In all those cases, the structures containing a first outer polyester layer, a second outer polyolefin layer, and a core EVOH layer also contain a core polyamide or i polyester layer.

In particular, EP-A-476,836 describes an oriented laminated film with a surface layer of a polyester, an EVOH core layer, an intermediate layer of certain polyamides and a heat-sealing layer of polyolefin. In the structures there claimed a given thickness ratio between the outer polyester layer and the core polyamide layer needs to be present, what improves orientability of the tape. The films described there are said to have excellent stretching processability, heat-sealing and packaging properties and good transparency after heat-sterilization.

WO 99/44824 and WO 99/44823 describe EVOH-containing heat-shrinkable films with at least four layers, i.e. a first outer layer comprising i.a. a polyethylene, a second outer layer possibly comprising a polyester, a core EVOH layer and an additional core polyamide or polyester layer. The bags obtained therefrom can be stacked on top of one another and sealed simultaneously and the presence of the core polyamide or polyester layer is said to give i.a. enhanced impact strength and render the tape more easily orientable.

WO 99/55528, EP-A-1,190,847, and WO 01/98081 relate to heat-shrinkable structures where in addition to the polyester and polyolefin outer layers, a core polyamide layer is always present and optionally also an EVOH core layer. These films are said to satisfy various properties required of a packaging material, through e.g. a control of the heat-shrinkage stress and of the heat-shrink.

In all the above documents the process actually described for the manufacture of these films is the so-called trapped bubble process. According to this technique, the polymer feeds are extruded through an annular die to give a thick tubing, called "tape". Said tubing is quickly quenched at the exit of the extrusion die in order to control crystallization, then it is re-heated to the suitably selected orientation temperature and oriented transversely by inflating it with a gas to expand its diameter and longitudinally by running the nip rolls that hold the bubble at a differential speed.

It has now been found that it is possible to obtain biaxially oriented films with a first outer layer of a polyester or copolyester, a second outer layer comprising an ethylene-or propylene-homo-or co-polymer, and a core layer comprising EVOH, without needing any polyamide or polyester core layer, by carrying out the biaxial orientation of the extruded tape by means of a tenter frame, preferably a simultaneous tenter frame.

It has been found that the films which are thus obtained have a high modulus in at least one direction, and are therefore very useful for most of the currently used packaging systems as it is known that for a good machinability, as well as for a good printability, the packaging material needs to be stiff, i.e. it should have a high modulus.

The films of the present invention are in particular characterized by a modulus which is higher than 6,000 kg/cm$^2$ in at least one direction.

Preferred films according to the present invention have a modulus which is higher than 6,500 kg/cm$^2$ in at least one direction, and more preferred are those films which have a modulus higher than 7,000 kg/cm$^2$ in at least one direction.

It has also been found that when a heat-shrinkable structure is obtained, it is possible to conjugate a high free shrink with a low shrink force, particularly in the transverse direction. This would be an advantage in all the packaging applications where the product to be packaged is sensitive to a high shrink force and in particular can be crushed or distorted by films with a high shrink force when these films are shrunk around the product.

Preferred heat-shrinkable films according to the present invention have in fact a free shrink of at least 10% in each direction at 120° C. and a maximum shrink tension in the transverse direction, in the temperature range of from 20 to 180° C. of less than 5 kg/cm$^2$, more preferably less than 3 kg/cm$^2$, and even more preferably less than 1 kg/cm$^2$.

DISCLOSURE Of INVENTION

A first object of the present invention is therefore a multi-layer, bi-axially oriented, thermoplastic film comprising a first outer layer comprising a polyester or a copolyester, a second outer layer comprising an ethylene-or propylene-homo-or co-polymer, a core layer comprising an ethylene-vinyl alcohol copolymer, and no core polyamide or polyester layers, said film having a modulus (evaluated according to ASTM D882) higher than 6,000 kg/cm$^2$, preferably higher than 6,500 kg/cm$^2$, and more preferably higher than 7,000 kg/cm$^2$, in at least one direction.

In one embodiment the multi-layer, biaxially oriented, thermoplastic film of the present invention is heat-shrinkable and has a free shrink of at least 10% in each direction at 120° C. and a maximum shrink tension, in the transverse direction, in the temperature range of from 20 to 180° C. of less than 5 kg/cm$^2$, more preferably less than 3 kg/cm$^2$, and even more preferably less than 1 kg/cm$^2$.

In another embodiment the multi-layer bi-axially oriented thermoplastic film of the present invention is a non-shrinkable, heat-set, film with a free shrink at 120° C. which is ≦10%, preferably ≦5%, more preferably ≦3% in each direction.

A second object is the process for the manufacture of a film of the first object by co-extrusion of a tape through a flat die followed by bi-axial orientation, with an orientation ratio generally comprised between about 2:1 and about 5:1 in each direction, by means of a tenter frame, said orientation step being optionally followed by a heat-setting step.

In a preferred embodiment the biaxial orientation is carried out simultaneously in both directions, by a simultaneous tenter frame.

A third object of the present invention is the use of a film according to the first object in packaging applications.

MODE FOR THE INVENTION

Definitions

As used herein, the term "film" is used in a generic sense to include plastic web, regardless of whether it is film or sheet Typically, films of and used in the present invention have a thickness of 150 µm or less, preferably they have a thickness of 120 µm or less, more preferably a thickness of 100 µm or less, still more preferably a thickness of 75 µn or less, and yet, still more preferably, a thickness of 60 µm or less.

As used herein, the phrase "outer layer" refers to any layer of film having only one of its principal surfaces directly adhered to another layer of the film.

As used herein, the phrases "inner layer" and "internal layer" refer to any layer having both of its principal surfaces directly adhered to another layer of the film.

As used herein, the phrase "inside layer" when referred to a package made using the multi-layer film of the invention refers to the outer layer of the film which is closest to the packaged product, relative to the other layers thereof.

As used herein, the phrase "outside layer" when referred to a package made using the multi-layer film of the invention refers to the outer layer of the film which is furthest from the product relative to the other layers thereof.

As used herein, the term "core", and the phrase "core layer", refers to any internal layer that preferably has a function other than serving as an adhesive or compatibilizer for adhering two layers to one another.

As used herein, the phrases "seal layer", "sealing layer", "heat seal layer", and "sealant layer", refer to an outer layer involved in the sealing of the fi; to itself, to another layer of the same or another film, and/or to another article which is not a film. With respect to packages having only fin-type seals, as opposed to lap-type seals, the phrase "sealant layer" generally refers to the inside layer of a package.

As used herein, the phrase "tie layer" refers to any internal layer having the primary purpose of adhering two layers to one another. Preferred polymers for use in tie layers include, but are not restricted to, suitably modified polyolefins and blends thereof with polyolefins.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "orientation ratio" and "stretching ratio" refer to the multiplication product of the extent to which the plastic film material is expanded in the two directions perpendicular to one another, i.e. the machine direction and the transverse direction.

As used herein, the phrases "heat-shrinkable," "heat-shrink" and the like, refer to the tendency of the film to shrink upon the application of heat, i.e., to contract upon being heated, such that the size of the film decreases while the film is in an un-restrained state. As used herein said term refer to films with a free shrink in at least one direction, as measured by ASTM D 2732, of at least 10% at 120° C.

As used herein, the term "polymer" refers to the product of a polymerization reaction, and is inclusive of homo-polymers, and co-polymers.

As used herein, the term "homo-polymer" is used with reference to a polymer resulting from the polymerization of a single monomer, i.e., a polymer consisting essentially of a single type of mer, i.e., repeating unit.

As used herein, the term "co-polymer" refers to polymers formed by the polymerization reaction of at least two different monomers. The term "co-polymer" is also inclusive of random co-polymers, block co-polymers, and graft co-polymers.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Although there are a few exceptions (such as TAFMER™ linear homogeneous ethylene-α-olefin copolymers produced by Mitsui, using Ziegler-Natta catalysts), heterogeneous polymers typically contain a relatively wide variety of chain lengths and co-monomer percentages.

As used herein, the phrase "homogeneous polymer" refers to polymerization reaction products of relatively narrow molecular weight distribution and relatively I narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler Natta catalysts.

As used herein, the term "polyolefin" refers to the polymer or co-polymer resulting from the polymerisation or co-polymerisation of unsaturated aliphatic, linear or cyclic, straight or branched, hydrocarbon monomers that may be substituted or unsubstituted.

More specifically, included in the term polyolefin are film-forming homo-polymers of olefin, co-polymers of olefin, co-polymers of an olefin and an non-olefinic co-monomer co-polymerizable with the olefin, such as vinyl monomers, and the like. Specific examples include polyethylene homo-polymer, polypropylene homo-polymer, polybutene homo-polymer, ethylene-α-olefin co-polymer, propylene-α-olefin co-polymer, butene-α-olefin co-polymer, ethylene-unsaturated ester co-polymer, ethylene-unsaturated acid co-polymer, (e.g., ethylene-($C_1$-$C_4$)alkyl acrylate or methacrylate copolymers, such as for instance ethylene-ethyl acrylate co-polymer, ethylene-butyl acrylate co-polymer, ethylene-methyl acrylate co-polymer, ethylene-methyl methacrylate co-polymer, ethylene-acrylic acid co-polymer, and ethylene-methacrylic acid co-polymer), ionomer resin, polymethylpentene, etc.

As used herein the term "modified polyolefin" is inclusive of modified polymers prepared by co-polymerizing the homo-polymer of the olefin or co-polymer thereof with an unsaturated carboxylic acid, e.g., maleic acid, fumaric acid or the like, or a derivative thereof such as the anhydride, ester or metal salt or the like. It is also inclusive of modified polymers obtained by incorporating into the olefin homo-polymer or co-polymer, by blending or preferably by grafting, an unsaturated carboxylic acid, e.g., maleic acid, fumaric acid or the like, or a derivative thereof such as the anhydride, ester or metal salt or the like.

As used herein, the phrase "ethylene-α-olefin copolymer" refer to such heterogeneous materials as linear low density polyethylene (LLDPE, with a density usually in the range of from about 0.915 g/cm$^3$ to about 0.930 g/cm$^3$), linear medium density polyethylene (LMDPE, with a density usually in the range of from about 0.930 g/cm$^3$ to about 0.945 g/cm$^3$) and very low and ultra low density polyethylene (LMDPE and ULDPE, with a density usually lower than about 0.915 g/cm$^3$); and homogeneous polymers such as metallocene-catalyzed homogeneous ethylene-α-olefin copolymer resins and linear homogeneous ethylene-α-olefin copolymer resins obtainable under homogeneous catalysis conditions but using Ziegler-Natta catalysts (Tafmer® resins by Mitsui). All these materials generally include co-polymers of ethylene with one or more co-monomers selected from $C_4$ to $C_{10}$ α-olefin such as butene-1, hexene-1, octene-1, etc. in which the molecules of the copolymers comprise long chains with relatively few side chain branches or cross-linked structures.

As used herein, the term "adhered", as applied to film layers, broadly refers to the adhesion of a first layer to a second layer either with or without an adhesive, a tie layer or any other layer therebetween, and the word "between", as applied to a layer expressed as being between two other specified layers, includes both direct adherence of the subject layer to the two other layers it is between, as well as a lack of direct adherence to either or both of the two other layers the subject layer is between, i.e., one or more additional layers can be imposed between the subject layer and one or more of the layers the subject layer is between.

In contrast, as used herein, the phrase "directly adhered" is defined as adhesion of the subject layer to the object layer, without a tie layer, adhesive, or other layer therebetween.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers. The degree of hydrolysis is preferably at least 50%, and more preferably, at least 85%. Preferably, the EVOH comprises from about 28 to about 48 mole % ethylene, more preferably from about 32 to about 44 mole % ethylene.

As used herein, the term "polyamide" refers to both polyamide homo polymers and polyamide co-polymers, also called co-polyamides.

As used herein the term "co-polyamide" on the other hand identifies the polyamide product built from at least two different starting materials, i.e. lactams, aminocarboxylic acids, equimolar amounts of diamines and dicarboxylic acids, in any proportion; this term therefore also encompasses terpolyamides and, in general, multi-polyamides.

As used herein the terms "major proportion" and "minor proportion" when referred to a resin as a component of a layer, refer to an amount respectively higher than 50 wt. % or lower than 50 wt. % of said resin calculated on the overall weight of the layer.

As used herein with the terms "polyamide layer" or "polyester layer" it is intended to refer to layers comprising a major proportion of polyamide or of polyester respectively.

DETAILED DESCRIPTION OF THE INVENTION

In the film according to the present invention, the first outer layer, that in the use of the film in packaging applications will be the outside, abuse-resistant, optionally printed layer, comprises a film forming polyester or co-polyester. Suitable film forming polyesters and co-polyesters can be crystalline, semi-crystalline, or lamorphous. If crystalline or semi-crystalline, their melting point is preferably comprised between about 100° C. and about 260° C., and is higher, preferably at least 10° C. higher, and even more preferably at least 20° C. higher, than the melting point of the polyolefin resin of the second outer layer, in order to favor heat-sealability of the film through said second outer layer. The Tg of the film forming polyesters or co-polyesters used for the first outer layer needs to be below 130° C., in order to allow orientation of the extruded structure at conventional temperatures. Preferably said Tg will be below 110° C., more preferably below 100° C., and even more preferably below 90° C.

Preferred polyesters and co-polyesters are aromatic ring-containing polymers.

Suitable linear homopolymeric polyesters include poly (ethylene terephthalate), poly(1,2-propylene terephthalate), poly(ethylene 2,5-dimethyl-terephthalate), poly(butylene terephthalate), poly(ethylene isophthalate), poly(ethylene 5-t-butyl-isophthalate), poly(butylene 2,6-naphthalate), and the like homopolymers.

Suitable copolymers can be random copolymers, i.e. those copolymers where the various components are randomly incorporated into the copolymer chain; alternating or patterned copolymers, i.e. those copolymers whose constituent units stand in a regular pattern of succession along the molecular chains; or block or segmented copolymers.

Examples of dicarboxylic acids that can be included in the copolyester resin are terephthalic acid, isophthalic acid, 2,5-dimethyl-terephthalic acid, 5-t-butyl-isophthalic acid, naphthalene dicarboxylic acid, cyclohexane-dicarboxylic acid, diphenyl ether di-carboxylic acid, sebacic acid, adipic acid, azelaic acid, and the like acids. Examples of diols that can be included in the copolyester resins are ethylene glycol, 1,2-propane-diol, 1,3-propane-diol, 1,4-butanediol, 1,6-hexane-diol, 1,4-cyclohexane-dimethanol, 2,2-bis(4-hydroxyphenyl)propane, and the like.

In the copolyester at least one of the carboxylic acids or of the diols is used in combination of at least two species.

The first outer layer may also comprise a blend of at least two components independently selected from polyesters and copolyesters.

Said layer may also comprise minor proportions of other compatible polymers and/or copolymers blended therein, such as polyamides and copolyamides, polyurethanes, and the like polymers.

Preferably however said first outer layer will comprise at least 70 wt. %, more preferably at least 80 wt. %, and even more preferably at least 90 wt. % calculated on the basis of the overall weight of the layer, of one or more polyesters and/or one or more copolyesters.

In a most preferred embodiment said first outer layer will be essentially made of one or more polyesters and/or one or more copolyesters.

Said first outer layer may also contain nucleating agents as known in the art (see for instance Table 1 of the Literature Review by 1H. Zhou available at the internet address www.crd.ge.com as 98CRD138). A class of particularly preferred nucleating agents are the inorganic compounds such as talc, silicate, clay, titanium dioxide, and the like. These compounds can be used in an amount of less than 5% by weight, typically in an amount of 1-2% by weight on the total weight of the layer. Other preferred nucleating agents are certain compatible polymers such as fluoropolymers (PTFE) and the faster crystallising polymers that can be blended with the polyester and/or copolyester of the first outer layer in an amount of up to e.g. 5-10% by weight.

The thickness of said first outer layer will typically be up to about 45% of the thickness of the overall structure, preferably up to about 40%, more preferably up to about 35% of the overall thickness.

Typically the thickness of said first outer layer will be comprised between about 8 and about 40%, and preferably between about 10 and about 35%, of the overall film thickness.

The second outer layer, that in the end package will be the inside, preferably heat-sealable, layer, will comprise one or more polymers selected from the group of ethylene homopolymers, ethylene co-polymers, propylene homopolymers and propylene co-polymers.

Ethylene homo-and co-polymers suitable for the second outer layer are selected from the group consisting of ethylene homo-polymers (polyethylene), heterogeneous or homogeneous ethylene-α-olefin copolymers, ethylene-vinyl acetate co-polymers, ethylene-($C_1$-$C_4$) alkyl acrylate or methacrylate co-polymers, such as ethylene-ethyl acrylate co-polymers, ethylene-butyl acrylate co-polymers, ethylene-methyl acrylate co-polymers, and ethylene-methyl methacrylate co-polymers, ethylene-acrylic acid co-polymers, ethylene-methacrylic acid co-polymers, and blends thereof in any proportion.

Preferred ethylene homo-and co-polymers for said second outer layer are e.g. polyethylene having a density of from about 0.900 $g/cm^3$ to about 0.950 $g/cM^3$, heterogeneous and homogeneous ethylene-α-olefin copolymers having a density of from about 0.880 $g/cm^3$ to about 0.945 $g/cm^3$, more preferably of from about 0.885 $g/cm^3$ to about 0.940 $g/cm^3$, yet more preferably of from about 0.890 $g/cm^3$ to about 0.935 $g/cm^3$, and ethylene-vinyl acetate copolymers comprising from about 3 to about 28%, preferably, from about 4 to about 20%, more preferably, from about 4.5 to about 18% vinyl acetate comonomer, and blends thereof.

Even more preferred ethylene homo-and co-polymers for said second outer layer are selected from the group consisting of heterogeneous ethylene-α-olefin copolymers having a density of from about 0.890 $g/cm^3$ to about 0.940 $g/cm^3$, homogeneous ethylene-α-olefin copolymers having a density of from about 0.890 $g/cm^3$ to about 0.925 $g/cm^3$, ethylene-vinyl acetate copolymers comprising from about about 4.5 to about 18% vinyl acetate comonomer, and blends thereof.

In one embodiment of the present invention the second outer layer comprises a blend of at least two different ethylene-α-olefin copolymers with a density of from about 0.890 $g/cm^3$ to about 0.935 $g/cm^3$, more preferably a blend of a homogeneous and a heterogeneous ethylene-α-olefin copolymer, optionally blended with ethylene-vinyl acetate copolymer.

Preferably, the ethylene homo-or co-polymers for said second outer layer have a melt index of from about 0.3 to about 10 g/10 min, more preferably from about 0.5 to about 8 g/10 min, still more preferably from about 0.8 to about 7 g/10 min, even more preferably from about 1 to about 6 g/10 min (as measured by ASTM D1238-190° C., 2.16 kg).

Propylene homo-and co-polymers suitable for the second outer layer are selected from the group consisting of propylene homo-polymers (polypropylene), crystalline or highly amorphous (i e., a polypropylene with a crystalline fraction of not more than about 10 wt. %), and propylene copolymers with up to 50 wt. %, preferably up to 35 wt. %, of ethylene and/or a ($C_4$-$C_{10}$)-α-olefin, and blends thereof in any proportion.

Preferred propylene homo-and co-polymers for said second outer layer are e.g. polypropylene, and propylene copolymers with up to 35 wt. %, of ethylene and/or butene-1, pentene-1, or hexene-1, and blends thereof in any proportion.

Even more preferred propylene homo-and co-polymers for said second outer layer are selected from the group consisting of highly amorphous polypropylene, propylene-ethylene copolymers with an ethylene content lower than about 25 wt. %, more preferably lower than about 15 wt. % and even more preferably lower than about 12 wt. %, propylene-ethylene-butene co-polymers and propylene-butene-ethylene copolymers with a total ethylene and butene content lower than about 40 wt. %, preferably lower than about 30 wt. %, and even more preferably lower than about 20 wt. %.

Preferably, the propylene homo-or co-polymers for said second outer layer have a melt index of from about 0.5 to about 20 g/10 min, more preferably from about 0.8 to about 12 g/10 min, still more preferably from about 1 to about 10 g/10 min (as measured by ASTM D1238-230° C., 2.16 kg).

Said second outer layer may also contain a blend of one or more ethylene homo-and/or co-polymers with one or more propylene bomo-and/or co-polymers, in any proportion.

Preferably however said second outer layer will comprise an ethylene homo-or co-polymer.

The second outer layer may also comprise a blend of a major proportion of one or more polymers of the group of ethylene homo-and copolymers and propylene homo-and copolymers, with a minor proportion of one or more other polyolefins or modified polyolefins, such as polybutene homo-polymers, butene-($C_5$-$C_{10}$)-α-olefin copolymers, ionomers, anhydride grafted ethylene-α-olefin copolymers, anhydride grafted ethylene-vinyl acetate copolymers, anhydride grafted propylene homopolymer, anhydride grafted propylene copolymer, rubber modified ethylene-vinyl acetate copolymers, and the like.

Said additional polymers may be blended with the basic polymers of said second outer layer in an amount that is typically up to about 40% by weight, preferably up to about 30% by weight, more preferably up to about 20% by weight, and still more preferably up to about 10% by weight.

In a preferred embodiment however said second outer layer will essentially consist of one or more polymers selected from the group of ethylene homo-and co-polymers, and propylene homo-and co-polymers.

The thickness of said second outer layer may vary widely depending on the overall structure of the end film. More particularly it can range from about 1-2 μm up to 60% or more of the overall thickness of the film. Generally it is at least about 5% of the overall thickness of the structure, being typically comprised between about 5 and about 60% of the overall thickness of the film.

The film according to the present invention also contains a core layer, which acts as a gas-barrier layer, comprising an ethylene-vinyl alcohol copolymer.

The gas-barrier layer—as indicated—may comprise one or more EVOH optionally admixed with a minor amount of one or more polyamide components, as known in the art. In particular said core layer will comprise at least 70%, still more preferably at least 80%, and yet still more preferably at least 90% by weight of a single EVOH or a blend of two or more EVOHs. Examples of EVOH that may well be employed in the production of films according to the present invention are EVAL™ EC F151A or EVAL™ EC F101A, marketed by Marubeni. The possible complement to 100% in said core gas-barrier layer is typically made of one or more polyamides, either aliphatic or aromatic, such as those commonly indicated as nylon 6, nylon 66, nylon 6/66, nylon 12, nylon 6,12, nylon 6I/6T, nylon MXD6/MXDI, and the like. In such a case a preferred polyamide is nylon 6/12, a copolymer of caprolactam with laurolactain, such as GRILON™ CF 6S or GRILON™ W8361 manufactured by EMS, MXD6/MXDI a copolyamide with units from metaxylylenediamine, adipic acic and isophthalic acid, such as GRILON™ FE458 manufactured by EMS or a multipolyamide with monomers from hexamethylenediamine, meta-xylylenediainne, adipic acid and sebacic acid, such as GRILON™ XE3569 manufactured by EMS. Other plasticisers and/or other resins compatible with EVOH, as known in the art, can however be present in addition to or alternatively to the polyamide.

Alternatively the possible complement to 100% in said EVOH-containing core layer can be made of one or more low molecular weight plasticisers, such as for instance the low molecular weight diols or triols, e.g., 1,2-propanediol, butanediol, propanetriol or pentanediol which are known to increase the stretchability of the EVOH resins.

Still alternatively the possible complement to 100% can be made by blends of polyamides with low molecular weight plasticisers.

In a most preferred embodiment however the core gas-barrier layer will essentially consist of EVOH as the gas barrier properties of 100% EVOH are much higher than those of blended EVOH.

The thickness of said barrier layer will depend on the barrier properties desired for the end film. More particularly its thickness will be set in order to provide the overall multi-layer film with the desired Oxygen Transmission Rate (OTR) (evaluated by following the method described in ASTM D-3985 and using an OX-TRAN instrument by Mocon). For high gas barrier films an OTR lower than 100, preferably lower than 80, and even more preferably lower than 50 $cm^3/m^2.d.atm$, when measured at 23° C. and 0% of relative humidity is generally required. Typically, when EVOH is employed as the gas-barrier material, optionally blended with up to 20% by weight of a polyarmide, this is achieved with barrier layers 2 to 6 μm thick. Thicker or thinner EVOH containing layers may however be employed depending on the barrier properties required and on the particular composition of said EVOH containing layer.

Unlike the films of the prior art, the films according to the present invention will not contain any polyamide or polyester core layer.

They may contain additional core layers, such as "bulk" layers or "structural" layers, i.e. layers that may be used to improve the abuse or puncture resistance of the film or just to provide the desired thickness, "shrink" layers, i.e. layers that may be added to improve the shrink properties of the end film, when a heat-shrinkable film is desired, and/or "seal-assist" layers, i.e., inner layers that are directly adhered to the second outer layer and favour the heat-sealability of the film (as described for instance in U.S. Pat. No. 6,682,825 or in U.S. Pat. No. 6,063,462), which are polyolefin layers. Preferably these layers, if present, are positioned between the core EVOH-containing layer and the second outer layer. Polymers particularly suitable for any of these polyolefin layers are ethylene homo-and co-polymers, e.g. low density polyethylene, ethylene-vinyl acetate copolymers, linear low density polyethylenes and linear very low density polyethylenes, optionally blended with minor proportions of other polyolefins. The thickness of these additional layers, if any, will depend mainly on the overall thickness desired for the film.

Other layers that may be present in the multi-layer film of the invention are tie or adhesive layers that are employed to better adhere one layer to another in the overall structure.

In particular the films of the present invention will preferably have tie layers directly adhered (i.e., directly adjacent) to one or both sides of the core EVOH-containing gas-barrier layer. Tie layers may also be used, when additional core layers are present, to better adhere said layers to the adjacent ones, e.g. to the first outer layer or the second outer layer.

Tie layers may include polymers having grafted polar groups so that the polymer is capable of covalently bonding to polar polymers. Useful polymers for tie layers include ethylene-unsaturated acid copolymers, ethylene-unsaturated ester copolymers, anhydride-modified polyolefins, and mixtures thereof. Preferred polymers for tie layers include one or more of thermoplastic polymers such as ethylene-vinyl acetate copolymers with high vinyl acetate content (e.g. 18-28 wt. % or even more), ethylene-(meth)acrylic acid copolymers, ethylene homo-polymers or co-polymers, such as LDPE, heterogeneous or homogeneous LLDPE and VLDPE, or EVA, modified with anhydride or carboxylic acid functionalities, blends of these resins or blends of any of the above resins with an ethylene homo-or co-polymer, and the like known resins.

The tie layers are of a sufficient thickness to provide the adherence function, as is known in the art. Their thickness however is generally kept as low as possible in view of the high cost of these resins. Typically they will be from about 1, preferably about 2, to about 10, preferably about 8 μm. While layers thinner than 1 μm are generally not sufficient to provide the desired adherence, tie layers thicker than 10 μm may well be employed but without providing a further increase in the bond properties.

The tie layers present in the overall structure may be of a substantially similar or of a different composition and/or thickness.

In one embodiment of the present invention the film has five layers, with the first outer layer, the second outer layer, the EVOH-containing core gas-barrier layer, a first tie layer directly adhering said core gas-barrier layer to the first outer layer and a second tie layer directly adhering said core gas-barrier layer to the second outer layer.

Preferred polymers for use in said tie layers are anhydride grafted ethylene-vinyl acetate and anhydride grafted ethylene-α-olefin copolymers that may be blended with one or more polyolefins. Most preferred polymers are anhydride grafted ethylene-α-olefin copolymers possibly blended with one or more polyolefins. In a most preferred embodiment said tie layers have the same composition.

In another embodiment the film has six to eight layers with the first outer layer, the second outer layer, the EVOH-containing core gas-barrier layer, a first tie layer directly adhering said core gas-barrier layer to the first outer layer, a second tie layer between said core gas-barrier layer and the second outer layer and one to three additional core polyolefin layers positioned between the second outer layer and the second tie layer.

In still another embodiment the film has seven to ten layers with the first outer layer, the second outer layer, the EVOH-containing core gas-barrier layer, a first tie layer between said core gas-barrier layer and the first outer layer, a second tie layer between said core gas-barrier layer and the second outer layer, an additional core polyolefin layer positioned between the first tie layer and the first outer layer, a third tie layer directly adhering said additional core polyolefin layer to the first outer layer and optionally one to three additional core polyolefin layers positioned between the second outer layer and the second tie layer.

In all the film layers, not only in the outer layers, the polymer components may contain appropriate amounts of additives normally included in such compositions. These include slip and anti-block agents such as talc, waxes, silica, and the like, antioxidants, fillers, pigments and dyes, cross-lining inhibitors, cross-linking enhancers, UV absorbers, antistatic agents, anti-fog agents or compositions, and the like additives known to those skilled in the art of packaging films.

In one particularly advantageous embodiment of the present invention, the film will comprise at least six layers, with the first outer layer, the second outer layer, the EVOH-containing core gas-barrier layer, a first tie layer between said core gas-barrier layer and the first outer layer, a second tie layer between said core gas-barrier layer and the second outer layer, and a bulk polyolefin layer positioned between the second outer layer and the second tie layer characterised in that the second outer layer is very thin (few µm, e.g., about 1 to 3 µm) and comprises slip and anti-blocking agents and the bulk layer which is directly adhered thereto, is a thicker layer containing the anti-fog additives. In a preferred embodiment said bulk layer comprises the same polymer or polymer composition of the adjacent second outer layer. By the time the film is used in packaging applications these additives, which are known to migrate within the polyolefin layers, will be present on the outer surface of the second outer layer.

Preferably, the film of the present invention has an overall thickness of from about 10 to about 80 µm, more preferably, from about 12 to about 70 µm, and, still more preferably, from about 14 to about 60 µm.

The film according to the present invention can be obtained by melt extruding the polymers or polymer blends used for each layer through a flat die, cooling quickly the multi-layer sheet exiting from the extrusion die by means of a chill roll, optionally irradiating the cast sheet thus obtained to get cross-linking, reheating this flat tape to the suitably selected orientation temperature, and biaxially stretching the heated tape at a stretching ratio of at least 2:1 in each direction, by a tenter apparatus, optionally stabilizing the obtained bi-axially oriented film by an annealing or a heat-setting step and finally cooling the thus obtained bi-axially oriented, multi-layer film.

Preferably the biaxial stretching will be carried out simultaneously as it has been found that it is possible in this way to reach much higher stretching ratios, even when the core EVOH-containing layer does not comprise plasticizers, and obtain films with a higher modulus.

In particular it has been found that using the simultaneous flat orientation technique in connection with a multi-layer tape with a first outer layer comprising a polyester or a copolyester, a second outer layer comprising an ethylene-or propylene-homo-or co-polymer, a core layer comprising an ethylene-vinyl alcohol copolymer, and no core polyamide or polyester layers, it is possible to easily reach stretching ratios of 5:1 in each direction even when the core gas-barrier layer is 100% EVOH and it is expected that also higher stretching ratios, such as for instance 5.5:1, 6:1, or 6.5:1, could be applied, at least in one direction, possibly by suitably adjusting the stretching conditions and/or the composition of the core EVOH-containing layer.

The oriented films thus obtained, whether heat-shrinkable or heat-set, are characterized by a modulus higher than 6,000 kg/cm$^2$ in at least one direction.

Preferred films of the present invention have a modulus higher than 6,500 kg/cm$^2$ in at least one direction, and more preferably higher than 7,000 kg/cm 2 in at least one direction. Even more preferred films of the present invention have a modulus higher than 6,000 kg/cm$^2$ in both directions.

Using the simultaneous tenter frame stretching technique it is also possible to obtain a bi-axially oriented heat-shrinkable film with a maximum shrink tension in the transverse direction, in the temperature range of from 20 to 180° C., of less than 5 kg/cm$^2$. Such a low shrink tension value in the transverse direction can be obtained also with heat-shrinkable films showing a high free shrink at 120° C., e.g., films with a total free shrink at 120° C. of 40%, 50%, 60%, or even more.

A second object of the present invention is therefore a process for the manufacture of a bi-axially oriented, thermoplastic, multi-layer film comprising a first outer layer comprising a polyester or a copolyester, a second outer layer comprising an ethylene-or propylene homo-or co-polymer, a core layer comprising an ethylene-vinyl alcohol copolymer, and no polyamide or polyester core layers, which process comprises co-extrusion of the film resins through a flat die and bi-axial orientation of the obtained cast sheet, by means of a tenter frame, simultaneously in the two perpendicular directions at an orientation ratio in the longitudinal direction higher than 2:1, preferably higher than 3:1 and at an orientation ratio in the cross-wise direction higher than 2:1, preferably higher than 3:1.

The process according to the present invention involves feeding the extruders with the solid polymer or polymer blend beads for the various layers, melting the polymer beads in the extruders and then forward the molten resins of the layers into a flat extrusion die where they are combined to give the desired sequence. The obtained tape, that is preferably from about 0.1 mm to about 2 mm thick, is then cooled, either by means of a chill roll, typically with the aid of an air knife or an electrostatic pinning system to keep the sheet in contact with the chill roll, or by using a liquid-knife as described in WO-A-95/26867 where a continuous and substantially uniform layer of water or of any other cooling liquid flows onto the surface of the sheet that does not contact the chill roll. Any other known means for cooling the cast web can however be employed.

The cooled sheet is then optionally fed through an irradiation unit, typically comprising an irradiation vault surrounded by a shielding. The flat sheet may in fact be irradiated with high energy electrons (i.e., ionizing radiation) from an iron core transformer accelerator. Irradiation is carried out to induce cross-linking. The flat sheet is preferably guided through the irradiation vault on rolls. It is thus possible by suitably combining the number of rolls and the path of the traveling web within the irradiation unit to get more than one exposure of the sheet to the ionizing radiation. In one embodiment, the sheet is irradiated to a level of from about 10 to about 200 kGy, preferably of from about 15 to about 150 kGy, and more preferably of from about 20 to about 120 kGy, wherein the most preferred amount of radiation is dependent upon the polymers employed and the film end use. While irradiation is preferably carried out on the extruded cast sheet just before orientation, as described above, it could also be carried out, alternatively or additionally, during or after orientation.

The optionally irradiated tape is then fed to the pre-heating zone of a simultaneous tenter apparatus, with or without a prior passage through an IR heated oven. The temperature of the oven in said pre-heating zone, the length thereof and the time spent by the traveling web in said zone (i.e. the web speed) can suitably be varied in order to bring the sheet up to the desired temperature for bi-axial orientation. In a preferred embodiment the orientation temperature is comprised between about 90° C and about 140° C. and the temperature of the pre-heating zone is kept between about 90° C. and about 150° C. In said pre-heating zone the sheet is clipped but it is not yet stretched. Thereafter, the resulting hot, optionally irradiated, and clipped sheet is directed to the stretching zone of the simultaneous tenter. Any simultaneous stretching means can be used in said zone. Preferably however the clips are propelled throughout the opposed loops of the tenter frame by means of a linear synchronous motor. A suitable line for simultaneous stretching with linear motor technology has been designed by Brückner GmbH and advertised as LISIM® line. An alternative line for simultaneous stretching of the extruded flat tape is the DMT line, based on a pantograph, equipped with two separated monorails on each side of the orientation unit. The configuration of the tenter can be varied depending on the stretching ratios desired. The stretching ratios that are applied in the process according to the present invention are generally comprised between about 2:1 and about 5:1 for MD stretching and between about 2:1 and about 5:1 for TD stretching. Preferably however stretching ratios higher than 2.5:1 in both directions are applied, wherein stretching ratios higher than 3:1 in both directions are more preferred. The temperature in the stretching zone is kept close to the selected orientation temperature. The stretched film is then transferred in a zone that, depending on whether a heat-shrinkable or non heat-shrinkable film is desired, may be a relaxation/annealing or heat-setting zone, heated to a temperature of about 70-100° C., or 130-170° C. respectively. Following said annealing or heat-setting step the film is transferred to a cooling zone where generally air, either cooled or kept at the ambient temperature, is employed to cool down the film. The temperature of said cooling zone is therefore typically comprised between about 20 and about 40° C. At the end of the line, the edges of the film, that were grasped by the clips and have not been oriented, are trimmed off and the obtained bi-axially oriented, heat-shrinkable or heat-set film is then wound up, with or without prior slitting of the film web to the suitable width.

To allow recycling of the trimmed edges, or at least of part thereof, a multi-manifold die may preferably be employed in the co-extrusion so that the edges of the extruded tape that will be grasped by the clips are of a single polymer or polymer composition, typically, in the present process, the polymer(s) of the first outer layer.

The bi-axially oriented film of the present invention, when heat-shrinkable, may have a total % free shrink (% shrink in MD+% shrink in TD), at 120° C., of from about 20 to about 140%, preferably from about 30 to about 130%, more preferably from about 40 to about 120%, and still more preferably from about 50 to about 110%.

As indicated above the bi-axially oriented heat-shrinkable films obtained by the process according to the present invention, are also characterised by a maximum shrink tension in at least the transverse direction, in the temperature range of from 20 to 180° C., of less than 5 kg/cm$^2$, preferably less than 3 kg/cm$^2$, and more preferably less than 1 kg/cm$^2$.

The biaxially oriented films of the present invention, when heat-set, will have a free shrink, at 120° C., lower than 10%, preferably lower than 5%, more preferably lower than 3%, and even more preferably lower than 2%, in each direction.

The films thus obtained have a thickness variation of less than 10 percent, preferably less than 8 percent, and more preferably less than 5 percent.

The thus obtained films may then be subjected to a corona discharge treatment to improve the print receptivity characteristics of the film surface. As used herein, the phrases "corona treatment" and "corona discharge treatment" refer to subjecting the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

The thus obtained films may also be coated on the surface of the second outer layer with e.g. an antifog composition, with or without a binder to incorporate the antifog additive into the film; a liquid smoke; an aroma transfer composition; an antibacterial or anti-mould composition; etc. as known in the field.

The present invention is further illustrated by the following examples, which are provided for the purpose of representation, and are not to be construed as limiting the scope of the invention.

EXAMPLE 1

A five-layer, heat-shrinkable film with the following layer arrangement (B)/(D)/(A)/(D)/(C), a total thickness of 25 μm, and a thickness ratio of 4/1/1/1/1.3 is produced by the general process described above. In particular, the temperature of the chill roll is kept at 15-25° C. and the extruded sheet is pinned to the chill roll by means of an air knife. The thickness of the cast extruded sheet before orientation is about 0.4 mm and the linear speed of the quenched sheet is about 8 m/min. The sheet is not irradiated. The temperature in the pre-heating zone is kept between about 120 and about 130° C. The stretching ratios applied are 4:1 in MD and 4:1 in TD and the temperature in the stretching zone is maintained between about 110 and about 120° C. The annealing step is carried out at about 80-85° C. and the cooling step at about 30-35° C. After cooling, the film edges are trimmed off and the film is wound onto a roll at a speed of about 36 m/min.

The resins employed for the various layers were as follows:

(A) EVOH-1 (=ethylene-vinyl alcohol copolymer containing 44 mole % of ethylene (EVAL™ E151B from Marubeni));

(B) EAO-1 (=a blend of 50 wt. % of a heterogeneous ethylene-octene copolymer with a density of 0.920 g/cm$^3$ and a melt index of 1.0 g/10 min (Dowlex™ 2045 by Dow); 25 wt. % of a heterogeneous ethylene-octene copolymer with a density of 0.935 g/cm$^3$ and a melt index of 2.6 g/10 min (Dowlex™ SC 2108 by Dow); 15 wt. % of a homogeneous ethylene-octene copolymer with a density of 0.902 g/cm$^3$ and a melt index of 1.0 g/10 min (Affinity™ PL1850 by Dow); and 10 wt. % of aimaster-batch based on ethylene-vinyl acetate copolymer (3.5% of vinyl acetate content) containing slip (3 wt. %) and anti-block (0.9 wt. %) agents);

(C) PET-1 (=PETG with Tg 81° C. Eastar 6763 by Voridian));

(D) Tie-1 (=homogeneous ethylene-α-olefin copolymer (Tafmer™ like) with d=0.906 g/cm$^3$ and MFI=1.5 g/10', modified with maleic anhydride (m.p. 116° C.) (ADMER™ AT1094E by Mitsui)).

The modulus of the obtained film was 6,400 kg/cm$^2$ in LD and 7,000 kg/cm$^2$ in TD.

The free shrink at 120° C. was 43% in LD and 50% in TD.

The shrink force was evaluated by the method described hereinbelow in the temperature range of from 20 to 180° C. and the maximum shrink tension thus determined was 0.14 kg/cm$^2$ in TD (at 113° C.) and 0.21 kg/cm$^2$ in LD (at 110° C.): specimens of the films (2.54 cm×14.0 cm) were cut in the longitudinal and transverse directions and clamped between two jaws, one of which was connected to a load cell. The two jaws kept the specimen in the center of a channel into which an impeller blowed heated air and three thermocouples measured the temperature. The signal supplied by the thermocouples was amplified and sent to an output connected to the "X" axis of an X/Y recorder. The signal supplied by the load cell was also amplified and sent to the "Y" axis of the X/Y recorder. The impeller started blowing hot air and the force released by the sample was recorded in grams. As the temperature increased, the measured profile of the shrink force versus the temperature was drawn on the X/Y recorder. When the temperature of 180° C. was reached, the heater was turned off, the specimen temperature gradually reduced and the profile of the shrink force under negative temperature gradients (cooling) was recorded.

The instrument produced a curve of the shrink force (g) versus temperature (° C.); dividing the value by the specimen width, shrink force in kg/cm was obtained and further dividing by the specimen thickness the shrink tension, in kg/cm², was obtained.

EXAMPLE 2

A five-layer, heat-shrinkable film with essentially the same layer arrangement as in Example 1 but with PET-2 (=PET 18696 with I.V. 0.71 by Voridian) replacing the PET-1 in layer (C), and with a thickness ratio of 5/1/1/1/1.5 is produced by the same process described in Example 1 with the only difference that the stretching ratio was 3:1 in the longitudinal direction and 3.5:1 in the transverse direction.

A film with a thickness of 25 μm was obtained characterized by a modulus of 7,000 kg/cm² in LD and 9,000 kg/cm² in TD.

The film had a free shrink of 15% in LD and 55% in TD at 120° C. and a shrink tension of 0 kg/cm² in TD and 1.20 kg/cm² in LD (at 105° C.)

EXAMPLE 3

A five-layer, heat-shrinkable film with the same layer arrangement and thickness ratio as in Example 1 is produced by the same process there described with the only difference that the cast sheet is irradiated before orientation to 45 kGray by means of a scan beam unit operated at 500 kVolt and the sheet is passed twice under the irradiation window to provide for a uniform cross-linking.

EXAMPLE 4

The process of Example 1 has been repeated with the only difference that instead of annealing at a temperature of 85-90° C., the bi-axially oriented film is heat-set at a temperature of 110-120° C. by reducing the line speed by 20% and allowing the stretching clips to converge by 20%.

The obtained film showed a total % free shrink (% free shrink in MD+% free shrink in TD) at 120° C. lower than 5.

EXAMPLE 5

The process of Example 2 has been repeated with the only difference that instead of annealing at a temperature of 85-90° C., the bi-axially oriented film was heat-set at a temperature of 110-120° C. by reducing the line speed by 20% and allowing the stretching clips to converge by 20%.

The obtained film showed a total % free shrink at 120° C. lower than 5.

EXAMPLE 6-10

The five layer heat-shrinkable films of Examples 6 to 10, having the following layer arrangement (B)/(D)/(A)/(D))/(C), have been prepared by substantially the same general process described in Example 1, with the following modifications: for melt casting an electrostatic pinning system (tension 12 kVolt and current 2 mA) was used instead of the air knife; the temperatures used in the pre-heating/stretching/annealing zones were 100-110/95-100/95-100° C. respectively; and 5% relaxation in MD was applied in the annealing zone.

The resins used for the different layers, the thickness of each layer, as well as the stretching ratios (SR) applied and the shrink values at 120° C. for some representative structures, are reported in following Table 1

TABLE 1

| Ex. No. | (B) (μm) | (D) (μm) | (A) (μm) | (C) (μm) | SR | MD/TD % shrink at 120° C. |
|---|---|---|---|---|---|---|
| 6 | EAO-2 (18) | Tie-1 (3)* | EVOH-1 (3) | PET-3 (8) | 4 × 4.5 | 25/36 |
| 7 | EAO-2 (18) | Tie-1 (3)* | EVOH-1 (3) | PET-4 (8) | 4 × 4 | 22/14 |
| 8 | EAO-3 (7) | Tie-1 (3)* | EVOH-1 (3) | PET-5 (12) | 3.3 × 3.5 | |
| 9 | EAO-3 (7) | Tie-1 (3)* | EVOH-1 (3) | PET-5 (12) | 3.3 × 3.8 | |
| 10 | EAO-4 (9) | Tie-2 (3)* | EVOH-1 (3) | PET-5 (10) | 3.3 × 3.8 | |

*Both tie layers had the same thickness
EAO-2 = blend of 90 wt. % of a homogenous ethylene-octene copolymer with density of 0.910 g/cm³ and melt index of 3.5 g/10 min (Affinity™ PL1845 by Dow) and 10 wt. % of a master-batch based on ethylene-vinyl acetate copolymer (3.5 % of vinyl acetate content) containing slip (3 wt. %) and anti-block (0.9 wt. %) agents;
EAO-3 = blend of 90 wt. % of a homogenous ethylene-octene copolymer with density of 0.910 g/cm³ and melt index of 3.5 g/10 min (Affinity™ PL1845 by Dow) and 10 wt. % of a master-batch based on ethylene-vinyl acetate copolymer (3.5 % of vinyl acetate content) containing slip (3 wt. %) and anti-block (1.5 wt. %) agents;
EAO-4 = blend of 50 wt. % of a homogenous ethylene-octene copolymer with density of 0.910 g/cm³ and melt index of 3.5 g/10 min (Affinity™ PL1845 by Dow) and 50 wt. % of a master-batch based on heterogenous ethylene-octene copolymer with a density of 0.920 g/cm³ and a melt index of 1.0 g/10 min (Dowlex™ 2045 byDow) containing antiblock (0.7 wt. %) agents, 4 wt. % of polyethoxylated ($C_{12}$—$C_{14}$) alcohols, and 2 wt. % glycerol mono- and di-oleate;
Tie-2 = ethylene-α-olefin copolymer with d = 0.915 g/cm³ and MFI = 4.5 g/10', modified with maleic anhydride (ADMER™ NF911 by Mitsui);
PET-3 = a blend of 97 wt. % PETG with Tg 81 °C. (Eastar 6763 by Voridian) and 3 wt. % of a master-batch based on PET containing slip and antiblock agents (Sukano GDC S503);
PET-4 = a blend of 97 wt. % PET with I.V. 0.71 (PET 18696 by Voridian) and 3 wt. % of a master-batch based on PET containing slip and antiblock agents (Sukano GDC S503);
PET-5 = a blend of 95 wt. % PET with I.V. 0.71 (PET 18696 by Voridian) and 5 wt. % of a master-batch based on PET containing slip and antiblock agents (Sukano GDC S503);

EXAMPLE 11

A five-layer, heat-shrinkable film with the same layer arrangement as in Example 7 but with EPC-1 (a blend of 90 wt. % of a propylene-ethylene copolymer with 3.4% of ethylene units, and m.p. 134° C. (Eltex PKS 400 by Solvay) and 10 wt. % of a masterbatch based on polypropylene containing slip (3 wt. %) and anti-blocking (0.5 wt. %) agents) to replace EAO-2 in layer (B), has been prepared by following essentially the same process of examples 6-10 but using stretching ratios of 3.8×4.2. The film showed a % free shrink at 120° C. of 30 (MD) and 23 (TD).

EXAMPLES 12-14

The processes of Examples 6, 7, and 11 have been repeated with the only difference that instead of being annealed, the bi-axially oriented films have been heat-set at a temperature of 130-140° C. by reducing the line speed by 20% and allowing the stretching clips to converge by 20%.

The obtained films showed a free shrink at 120° C. ≦2% in each direction.

EXAMPLE 15

A heat-set, biaxially oriented, five-layer film with the following structure

EAO-3 (13 µm) /Tie-1 (3 µm) /EVOH-1 (3 µm) /Tie-i (3 µm) /PET-5 (13 µm)

has been prepared by the general process of example 9 but replacing the annealing step with a heat-setting step carried out at an average temperature of about 160° C.

EXAMPLE 16 and 17

The films of these examples have been prepared as described in Example 15 but replacing PET-5 with PET-6 (example 16) and PET-7 (example 17), respectively, wherein PET-6=a blend of 92 wt. % PET with I.V. 0.71 (PET 18696 by Voridian), 5 wt. % of a master-batch based on PET containing slip and antiblock agents (Sukano GDC S503), and 3 wt. % of a PETC-based masterbatch containing talc as the nucleating agent;

and

PET-7=a blend of 92 wt. % PET with I.V. 0.71 (PET 18696 by Voridian), 5 wt. % of a master-batch based on PET containing slip and antiblock agents (Sukano GDC S503), and 3 wt. % of a terpolymer propylene-butylene-ethylene with m.p. 135° C. (Adsyl 5C37F by Basell) as the nucleating agent.

EXAMPLE 18-23

Five-layer, heat-set films, having the following layer arrangement (B) (11 µm)/(D) (3 µm)/(A) (3 µm)/(D) (3 µm)/(C) (15 µm)

wherein the resins employed for each layer are reported in Table 2 below, have been prepared by the process of Example 15 but applying stretching ratios of 3.3×3.5.

TABLE 2

| Ex. No. | (B)   | (D)   | (A)    | (C)    |
|---------|-------|-------|--------|--------|
| 18      | EAO-3 | Tie-1 | EVOH-1 | PET-4  |
| 19      | EAO-3 | Tie-2 | EVOH-1 | PET-4  |
| 20      | EAO-3 | Tie-1 | EVOH-1 | PET-6  |
| 21      | EAO-3 | Tie-1 | EVOH-1 | PET-8  |
| 22      | EAO-3 | Tie-1 | EVOH-1 | PET-9  |
| 23      | EAO-3 | Tie-1 | EVOH-1 | PET-10 |

PET-8=a blend of 95 wt. % PET with I.V. 0.80 (PET 9921W by Voridian) and 5 wt. % of a master-batch based on PET containing slip and antiblock agents (Sukano GDC S503;

PET-9=a blend of 92 wt. % PET with I.V. 0.80 (PET 9921W by Voridian), 5 wt. % of a master-batch based on PET containing slip and antiblock agents (Sukano GDC S503), and 3 wt. % of a PETG-based masterbatch containing talc as the nucleating agent;

PET-10=a blend of 92 wt. % of PET with I.V. 0.9 (PET 12822 by Voridian), 5 wt. % od a master-batch based on PET containing slip and antiblock agents (Sukano GDC S503), and 3 wt. % of a PETG-based masterbatch containing talc as the nucleating agent.

EXAMPLES 24-25

The following heat-set structures have been prepared by the same general process of Example 15 but applying stretching ratios of 3.5×4.2:

Ex. 24 EAO-2 (16 µm)/Tie-1 (3.5 µm)/EVOH-1 (3 µm)/Tie-1 (3.5 µm)/PET-4 (14 µm).

Ex. 25 EAO-2 (13 µm)/Tie-1 (3.5 µm)/EVOH-2 (3 µm)/Tie-1 (3.5 µm)/PET-4 (14 µm)

wherein

EVOH-2=ethylene-vinyl alcohol copolymer containing 32 mole % of ethylene (EVAL™ F101B from Marubeni));

The heat-set films of examples 15 to 25 have a % free shrink at 120° C. which is ≦1 in each direction.

EXAMPLE 26

The following heat-set film has been prepared by the same general process of Example 15 but applying stretching ratios of 3.3×4.0

EAO-2 (24 µm)/Tie-1 (5 µm)/EVOH-1 (5 µm)/Tie-1 (5 µm)/PET-4 (21 µm)

EXAMPLE 27

By following substantially the same process described in Example 15 it is possible to prepare a film differing from that of Example 15 for the second outer layer (B) where a blend of 40 wt. % of a propylene-butylene-ethylene terpolymer with m.p. 135° C. (Adsyl 5C37F by Basell) and 60 wt. % of a masterbatch based on an ethylene-α-olefin plastomer with density of 0.902 g/Cm$^3$ and m.p. 99° C. (Affinity PL1880 by Dow) containing 4 wt. % of polyethoxylated ($C_{12}$-$C_{14}$) alcohols and 2 wt. % glycerol mono-and di-oleate (EAO-5) replaces EAO-3.

EXAMPLES 28 and 29

By following substantially the same process described in Example 15 it is possible to prepare six layer films with the following arrangement of layers (B)/(E)/(D)/(A)/(D)/(C) and thickness ratio of 1/6/1.5/1.5/1.5/6 wherein the composition of layers (A), (D), and (C) is as in Example 15, and in Example 28 layer (B) is a propylene-butylene-ethylene terpolymer with m.p. 135° C. (Adsyl 5C37F by Basell) containing 3 wt. % slip and 1 wt. % antiblocking agents and layer (E) is EAO-5 and, in Example 29 layer (B) is EAO-2 and layer (E) is a blend of 50 wt. % of a homogeneous ethylene-octene copolymer with density of 0.910 g/cm$^3$ and melt index of 3.5 g/10 min (Affinity™ PL1845 by Dow) and 50 wt. % of a master-batch based on heterogeneous ethylene-octene copolymer with a density of 0.920 g/cm$^3$ and melt index of 1.0 g/10 min (Dowlex™ 2045 by Dow) containing 4 wt. % of polyethoxylated ($C_{12}$-$C_{14}$) alcohols, and 2 wt. % glycerol mono-and di-oleate (EAO-6).

The films obtained according to the present invention can be used in the packaging of food and non food, oxygen-sensible, products as known in the art. To this purpose they can be used as such in the form of a film or laminate and either wrapped up around the product or employed as a lid for any suitable container such as a tray, or they may be first converted into flexible containers, such as bags or pouches, by conventional techniques well known to the person skilled in the art. They can also be coupled or laminated to other films or sheets to obtain a packaging material of improved performance.

In a most preferred embodiment the biaxially oriented non heat-shrinkable films of the present invention can conveniently be employed in all those processes that actually use sheets of biaxially oriented polyester (BO-PET) glue-laminated to a heat-sealable barrier film. While the performance of the films of the present invention in these packaging processes is at least comparable to that obtained with the conventional laminates because of the remarkable stiffness of the films of the present invention, the process for the manufacture thereof is much easier and much more convenient as any lamination step may be avoided, as well as the use of any glue and solvent involved therein.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A multilayer, biaxially oriented, thermoplastic film comprising:
   (A) a first outer layer comprising at least one member selected from the group consisting of polyester homopolymer and polyester copolymer;
   (B) a second outer layer comprising at least one member selected from the group consisting of ethylene homopolymer, ethylene copolymer, propylene homopolymer, and propylene copolymer; and
   (C) a first core layer comprising ethylene/vinyl alcohol copolymer; and wherein the multilayer film has a modulus, according to ASTM D882, of at least 6,000 kg/cm$^2$ in at least one direction, with the proviso that the multilayer film does not have a core layer containing at least 50 weight percent, based on layer weight, of at least one member selected from the group consisting of polyamide and polyester.

2. The multilayer film according to claim 1, wherein the second outer layer comprises at least one member selected from the group consisting of ethylene homopolymer and ethylene copolymer.

3. The multilayer film according to claim 2, wherein the second outer layer comprises at least one member selected from the group consisting of ethylene homopolymer, heterogeneous ethylene/alpha-olefin copolymer, homogeneous ethylene/alpha-olefin copolymer, ethylene/vinyl acetate co-polymer, ethylene/C$_{1-4}$ alkyl acrylate copolymer, ethylene/C$_{1-4}$ methacrylate co-polymer, ethylene/acrylic acid copolymer, ethylene/methacrylic acid co-polymer.

4. The multilayer film according to claim 1, wherein the film has a modulus of at least 6,500 kg/cm$^2$ in at least one direction.

5. The multilayer film according to claim 1, wherein the film has a modulus of at least 7,000 kg/cm$^2$ in at least one direction.

6. The film according to claim 1, wherein the film has a total free shrink, at 120° C., of from about 20 percent to about 140 percent.

7. The film according to claim 6, wherein the film has a total free shrink, at 120° C., of from about 30 to about 130 percent.

8. The film according to claim 6, wherein the film has a total free shrink, at 120° C., of from about 40 to about 120 percent.

9. The film according to claim 6, wherein the film has a total free shrink, at 120° C., of from about 50 to about 110 percent.

10. The multilayer film according to claim 6, wherein the film has a maximum shrink tension in the transverse direction of less that 5 kg/cm$^2$ in the temperature range of from 20° C. to 180° C.

11. The multilayer film according to claim 10, wherein the film has a maximum shrink tension in the transverse direction of less than 3 kg/cm$^2$.

12. The multilayer film according to claim 1, wherein the film is a heat-set film and has a total free shrink at 120° C. of from 0 to 10 percent in each direction.

13. The multilayer film according to claim 12, wherein the film has a total free shrink at 120° C. of from 0 to 5 percent in each direction.

14. The multilayer film according to claim 1, wherein the first outer layer comprises at least one member selected from the group consisting of (a) polyester homopolymer comprising an aromatic ring and (b) polyester copolymer comprising an aromatic ring.

15. The multilayer film according to claim 1, further comprising:
   (D) a fourth layer which serves as a first tie layer, the fourth layer being directly adhered to both the first outer layer and the core layer; and
   (E) a fifth layer which serves as a second tie layer, the fifth layer being directly adhered to both the second outer layer and the core layer.

16. The multilayer film according to claim 1, further comprising:
   (D) a fourth layer which serves as a first tie layer, the fourth layer being between the first outer layer and the first core layer;
   (E) a fifth layer which serves as a second tie layer, the fifth layer being between the second outer layer and the first core layer; and
   (F) a sixth layer which serves as a second core layer, the sixth layer being between the second outer layer and the fifth layer, the sixth layer comprising polyolefin.

17. The multilayer film according to claim 16, further comprising:
   (G) a seventh layer which serves as a third tie layer, the seventh layer being between the second core layer and the first outer layer; and
   (H) an eighth layer which serves as a third core layer, the eighth layer being between the second tie layer and the second outer layer, the third core layer comprising polyolefin.

18. The multilayer film according to claim 17, further comprising an anti-fog agent in the third core layer.

19. The multilayer film according to claim 1, further comprising an anti-fog agent in the second outer layer.

20. The multilayer film according to claim 1, wherein the film has been irradiated to a level of from about 10 to about 200 kiloGrays.

21. A process for making a biaxially oriented, thermoplastic multilayer film comprising:
   (A) coextruding resins through a flat die so that a cast sheet is produced, the cast sheet comprising:
      (i) a first outer layer comprising at least one member selected from the group consisting of polyester homopolymer and polyester copolymer;
      (ii) a second outer layer comprising at least one member selected from the group consisting of ethylene homopolymer, ethylene copolymer, propylene homopolymer, and propylene copolymer; and
      (iii) a first core layer comprising ethylene/vinyl alcohol copolymer; and (B) orienting the cast sheet in a longitudinal direction and in a transverse direction, with the orientation in the longitudinal and transverse directions being carried out simultaneously, with the ratio of the orientation in the longitudinal direction to the orientation in the transverse direction being at least 2:1, respectively, the orientation being conducted with a tenter frame; and wherein the multilayer film has a modulus, according to ASTM D882, of at least 6,000 kg/cm$^2$ in at least one direction, with the proviso that the multilayer film does not have a core layer containing at least 50 weight percent, based on layer weight, of at least one member selected from the group consisting of polyamide and polyester.

22. The process according to claim 21, further comprising heat-setting the multilayer film.

* * * * *